Patented Apr. 4, 1944

2,345,827

UNITED STATES PATENT OFFICE 2,345,827

PURIFICATION OF WATER

Hubert L. Olin, Iowa City, Iowa

No Drawing. Application October 11, 1937, Serial No. 168,440

1 Claim. (Cl. 210—23)

This invention relates to the purification of water and particularly to the clarification of water.

The clarification of water consists in the removal of fine non-settling particles which impart turbidity to the water. During the process of removing such non-settling material a certain amount of algae or other transparent impurities may also be precipitated. The turbidity-imparting material consists in the main, however, of colloidal silt. It has long been known that these silt particles carry negative charges. So also do most bacteria present in impure waters intended eventually for domestic use. The problem has been to remove the silt and other turbidity producers without resort to the conventional use of soluble aluminum or ferrous salts or the like, which have the disadvantage of increasing the hardness of the water in which they are used.

One of the objects of the invention is to provide a process of clarification which is inexpensive, simple and highly effective.

As a clarification reagent I employ highly colloidal clay of the swelling bentonite type. By the term "highly colloidal clay of the swelling bentonite type" I intend to define the clays which have the property of forming gels with water of volume several times greater than that of the initial clay. In practice I have used with excellent results bentonites of the type produced in the vicinity of the Black Hills of Wyoming and South Dakota, which are capable of forming thick gels five or six times the volume of the original bentonite.

The highly colloidal clay of the swelling bentonite type, which I use in practice, is one in which the sodium content is sufficiently high that it commonly is designated as sodium bentonite. This form of bentonite distinguishes sharply, so far as capacity for expansion or swelling in water is concerned, from the so-called calcium bentonite which resembles ordinary clays in that it swells relatively slightly.

Furthermore, when added, either in its hydrated or in its natural dry state, to water to be purified, sodium bentonite exhibits a marked capacity to exchange its sodium for metallic elements of higher valency, for example, calcium and aluminum. There is but little tendency, however, for reversal of this base exchange, for instance, of calcium for sodium; the direction of the exchange being from a metal of low valence to one of higher, and from the swelling type to the non-swelling type.

The essence of my invention consists in effecting flocculation of natural sodium bentonite within the body of water to be clarified, so that the flocs, in the course of their formation and growth, will occlude, entrap or entrain turbidity-producing materials in the water.

Hereinafter I shall use the term "negatively charged dispersoids" to include not only silt and bacteria, but also other turbidity formers which may be absorbed, occluded or entrained as the result of collisions with negatively charged flocs of hydrated sodium bentonite.

In accordance with the present invention I expand the clay in water in the absence of any substantial proportion of salts or other ionizable substances. Such substances have the effect of coagulating the gel or sol and detracting from the coagulating effect during the water purification or clarification operation. It must be understood that practically all natural waters contain a small amount of such ionizing substances or coagulants, but the amount thereof contained in the water necessary for making a slurry or gel is negligible and has no practical effect in the direction of coagulating the sol.

According to the present invention the bentonite slurry is added to the water to be treated and is intimately mixed therewith. The amount of slurry added may vary within wide limits. Ordinarily I prefer to add between 40 and 50 parts per million of bentonite to the water to be treated. The water normally containing ionizable substances, flocculation sets in almost immediately, the flocs growing or becoming larger and visible to the naked eye. In so growing the flocs grow around and occlude or enmesh particles of solid material which cause turbidity and also appear to aggregate with other colloids in the water, such as algae. As the flocs become larger they settle to the bottom and in thus moving downwardly through the liquid they effectively clear the water of substantially all turbidity.

Ordinarily, ionizable substances, for example salts, normally causing hardness in water, are present in the liquid being treated in quantities sufficient for the coagulation of the bentonite. Thus, using an addition of bentonite equivalent to about 40 parts per million, I have found that a total hardness of around 100 parts per million is sufficient for satisfactory flocculation. When there is little turbidity present a total hardness of much less than 100 parts per million may be sufficient. In the rare case of turbid water which contains insufficient ionizable substances, the same may be added to the water. This addition may be effected before or after the bentonite slurry is added to the water and in no case should such substances be added to the slurry before it is incorporated in the water being treated. Such a course of procedure greatly reduces the volume of the floc and consequently impairs to a great extent the cleansing effect of the floc during its formation and settlement. In highly turbid waters, greater amounts of clay are needed and ordinarily it is necessary to add ionizable compounds such as lime. I have obtained excellent results with highly turbid waters (2,100 parts per million) by using 50 parts of lime and 125 parts of the clay per million parts of water.

The ionizable substances which may be added may consist, for example, of lime, practically any salt, alkali or weak acid. I may suitably add lime, if that is necessary, and/or aluminum sulphate and other aluminum or ferric salts. These materials not only have the advantage of providing ionizable substances which crack the clay sol, but they, of themselves, provide a floc which contributes to the clarification of the water.

My improved clarification process is independent within practical limits of the acidity or alkalinity of the water. Up to pH values of around 9, the volume of the floc and the settling rates are substantially constant. The greater pH values favor greater volume and more rapid settling of the floc.

The amount of highly colloidal clay which may be used depends upon the degree of turbidity of the water to be treated and the results which are desired. I have obtained remarkable results in employing between 15 parts per million of bentonite and 100 parts per million or more of bentonite. I find that the floc is of much greater volume than that produced by a simple addition of alum and furthermore I find that the floc produced is more amenable to separation by filtration.

In the practice of my invention I prefer to introduce the water to be treated into a large basin, to prepare the slurry by mixing the colloidal clay with water to make a sol or suspension containing around 5% or more clay. This sol is added to the water in the basin, for example, in the proportions indicated above, and is mixed with the water. The water is then allowed to stand for a suitable period in which flocculation and precipitation of the floc occurs. This is usually completed in less than six hours and the clarified supernatant liquid may be drawn off or the whole contents may be passed to sand filters which retain the floc.

One advantage of my process is that the clarification is accompanied by a certain degree of softening. The bentonites of the type contemplated by this invention are characterized by a sodium content and during flocculation this content is replaced to a certain extent by the magnesium and calcium compounds of the water being treated. Thus, magnesium carbonate and calcium carbonate become replaced in the water by sodium carbonate which is, of itself, a well known softening agent.

Having thus described my invention, I declare that what I claim is:

The process of clarifying natural raw water which comprises separately dispersing therein a slurry of unflocculated sodium bentonite and ionizable material and permitting the bentonite to react with ionizable substances present in the raw water, and with the added ionizable material, to form hydrous flocs, waiting for the flocs to entrain negative dispersoids and to undergo gravity settling, and separating the supernatant water therefrom.

HUBERT L. OLIN.